(12) United States Patent
Chen

(10) Patent No.: US 7,076,579 B2
(45) Date of Patent: Jul. 11, 2006

(54) STRUCTURE AND METHOD FOR MULTI-SECTION MANAGEMENT OF A BUFFER

(75) Inventor: Ling-Feng Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 473 days.

(21) Appl. No.: 10/249,284

(22) Filed: Mar. 28, 2003

(65) Prior Publication Data

US 2004/0107311 A1    Jun. 3, 2004

(30) Foreign Application Priority Data

Nov. 29, 2002   (TW) ............................... 91134891 A

(51) Int. Cl.
    *G06F 12/00*   (2006.01)
(52) U.S. Cl. .................... 710/52; 710/310; 711/113; 711/173
(58) Field of Classification Search ...................... None
    See application file for complete search history.

(56) References Cited

U.S. PATENT DOCUMENTS 5,727,232 A * 3/1998 Iida et al. ..................... 710/56
5,778,420 A * 7/1998 Shitara et al. ............... 711/113

\* cited by examiner

*Primary Examiner*—Christian P. Chace
(74) *Attorney, Agent, or Firm*—Winston Hsu

(57) ABSTRACT

A structure and a method of managing multiple sections of a buffer provide an initial block register and a memory unit. A buffer managing unit is capable of operating consecutively in a specific section set between the initial block register and the end block register. When the pickup head leaves the original track and skips to another track to read data, the initial block register and the end block register are reset. The contents in the original register are stored in one division of the memory unit. In this way, the original data stored in the specific section is not abandoned. When the pickup head needs to read the data in the original track, the contents in the registers are restored from the division of the memory unit to the registers.

8 Claims, 7 Drawing Sheets

STRUCTURE AND METHOD FOR MULTI-SECTION MANAGEMENT OF A BUFFER

BACKGROUND OF INVENTION

1. Field of the Invention

The present invention relates to a managing method for a buffer, and more particularly, to a multi-section managing method and structure for a buffer used in a disk drive.

2. Description of the Prior Art

As network and hardware technology of computers advances, the need for data storing media increases. Multimedia, such as music data, even when processed with compression technology still occupies much space, and thus data storing media such as magneto-optical (MO), CD-R, CD-RW, and JAZZ have been developed. Especially important is the optical disk family, because of the popularity of audio CDs and CD-ROMs, CD-R and CD-RW were accepted into the market rapidly. As the costs of CD recorders and CD-R disks are constantly decreasing and CDs are often included as supplements to books and magazines, the optical disk and the disk drive is an important part of daily life.

FIG. 1 is a block diagram of a recordable disk drive according to the prior art. While recording, the disk drive receives data from an ATAPI/SCSI interface 90 at a buffer 70, and an error correcting code (ECC) encoder 40 generates an ECC of the received data in the buffer 70. Following this, a buffer managing unit 50 transmits the data having the ECC to a cross interleave Reed-Solomon code (CIRC) encoder 30 to generate a CIRC of the data. Finally, a pickup head 20 records the data having the ECC and the CIRC onto the optical disk 10. In said procedure, the buffer managing unit 50 manages the sequence of ECC encoding and the access time of the data in the buffer 70. Generally speaking, the buffer 70 is usually a DRAM.

On the other hand, when the disk drive outputs data, the data having the ECC and the CIRC are transmitted from the pickup head 20 to a CIRC decoder 60 for decoding. Following this, the CIRC decoded data is transmitted to the buffer 70, and an ECC decoder 80 decodes the ECC of the data in the buffer 70. Finally, the buffer managing unit 50 outputs the ECC decoded data in the buffer 70 to the ATAPI/SCSI interface 90. In said procedure, the buffer managing unit 50 is used for managing the sequence of ECC decoding and the access time of the data in the buffer 70.

Generally speaking, the buffer managing unit 50 has a plurality of registers for managing access of the data in the buffer 70. The plurality of registers includes a pointer register of a received data block (simply called Buffer_ptr), a pointer register of a decoded data block (simply called Decode_ptr), a pointer register of a transmitted data block (simply called Transmit_ptr), and an end block register (simply called End_BLK).

The storage space of the buffer 70 is capable of providing a fixed capacity such as 2 Kbytes as a block, and data is accessed or decoded by block. The End_BLK is used for setting a number of blocks. For example, if the content of the End_BLK is set to N, it indicates that the buffer 70 has N blocks ($B_0 \sim B_{N-1}$), each block being 2 Kbytes. As shown in FIG. 2a, at the initial state of reading data from disk, Buffer_ptr, Decode_ptr, and Transmit_ptr point to the same initial block ($B_0$).

As shown in FIG. 2b, when the buffer 70 starts receiving the CIRC decoded data, the content of the Buffer_ptr points to the first block storing the data and then successively points to the next blocks as the amount of received data increases.

As shown in FIG. 2c, when the buffer 70 has the data stored in the blocks, the ECC decoder 80 decodes ECC of the data a block at a time. The data after executing ECC decoding is put into the original block, and the content of the Decode_ptr points to the decoded block and then successively points to the next block as the ECC decoded data increases.

As shown in FIG. 2d, when the data in the buffer 70 is decoded, the buffer managing unit 50 outputs the data block by block. The content of the Transmit_ptr points to the block preparing to output and then successively points to the next block as the output data increases.

The buffer 70 according to the prior art operates cyclically. For example, after the content of the Buffer_ptr points to the last block (set by End_BLK), that is, points to the block $B_{N-1}$, the content of the Buffer_ptr will subsequently point to the initial block, that is, the block $B_0$. Similarly, Decode_ptr and Transmit_ptr also operate in the same way.

The buffer 70 according to the prior art further has a pre-buffering function. For example, if a host (not shown) only requests to read the data until the block $B_{10}$, because of the pre-buffering function, the data after the block $B_{10}$ will be read by the pickup head and be stored. The merit of the pre-buffering function is that when the host requests the data after the block $B_{10}$ again, the buffer managing unit sends a hit condition and outputs the data directly. Therefore, the time of driving the pickup head 20 to search the data on the optical disk is saved. When the data that the host needs is not in the buffer 70, that is, a miss condition, the pickup head 20 must seek another track to read new data. At this time, Buffer_ptr, Decode_ptr, and Transmit_ptr point to the same initial block $B_0$ again. In other words, the data originally stored in the buffer 70 are abandoned.

In the reading procedure, when the pickup head 20 has to skip to another track to read data and then come back to the original track to read data, because the original data in the buffer 70 are abandoned by the miss condition, the pickup head has to reread the abandoned data in the original track.

The above-described condition occurs frequently in Mount Rainier disks. If some problem occurs in successive writing to the Mount Rainier disk, the data having the problem will be written to a specific area of the optical disk. This results in discontinuous data. When the pickup head 20 reads the Mount Rainier disk, it has to skip to the specific area to read data and then come back to the original track. This action of skipping tracks results in the pickup head repeatedly or redundantly reading data and reduces the effectiveness of the disk drive.

SUMMARY OF INVENTION

It is therefore a primary objective of the claimed invention to provide a buffer managing structure and a method of effectively managing multiple sections of a buffer to solve the above-mentioned problems.

According to the claimed invention, a multi-section managing structure for a buffer of a CD drive comprises a set of registers for managing a specific section of the buffer according to the contents in the set of registers and a memory unit having a plurality of divisions. Each division is capable of storing contents in the set of registers. Further, the contents in the set of registers can be stored into the first division, and the contents of the registers can be restored from the second division.

The claimed invention further provides a multi-section managing structure for a buffer comprising a buffer, a plurality of records, and a memory unit. The buffer has a plurality of sections, and each section has a plurality of blocks. Each record indicates at least an initial block and an end block of a specific section. The memory unit is capable of storing the plurality of records.

The claimed invention further provides a method of managing multiple sections of a buffer comprising the following steps: providing a location of a first initial block and a location of a first end block for a first data operating consecutively and cyclically between the location of the first initial block and the location of the first end block; and providing a location of a second initial block and a location of second end block for a second data operating consecutively and cyclically between the location of the second initial block and the location of the second end block.

These and other objectives of the claimed invention will no doubt become obvious to those of ordinary skill in the art after reading the following detailed description of the preferred embodiment that is illustrated in the various figures and drawings.

DETAILED DESCRIPTION

When the buffer managing unit according to the prior art is in the miss condition, Buffer_ptr, Decode_ptr, and Transmit_ptr point to the initial block$B_0$ resulting in the data in the buffer being abandoned, the present invention provides a multi-section managing structure and method for a buffer to solve this problem.

The buffer managing unit according to the present invention further provides an initial block register (simply called Init_BLK) and a memory unit. The buffer is capable of operating consecutively and cyclically between Init_BLK and End_BLK, and the memory unit is capable of storing the contents of Buffer_ptr, Decode_ptr, Transmit_ptr, Init_BLK, and End_BLK for a specific condition, and restoring other contents of Buffer_ptr, Decode_ptr, Transmit_ptr, Init_BLK, and End_BLK. In this way, the buffer managing unit is capable of managing multiple sections.

Figure 1:
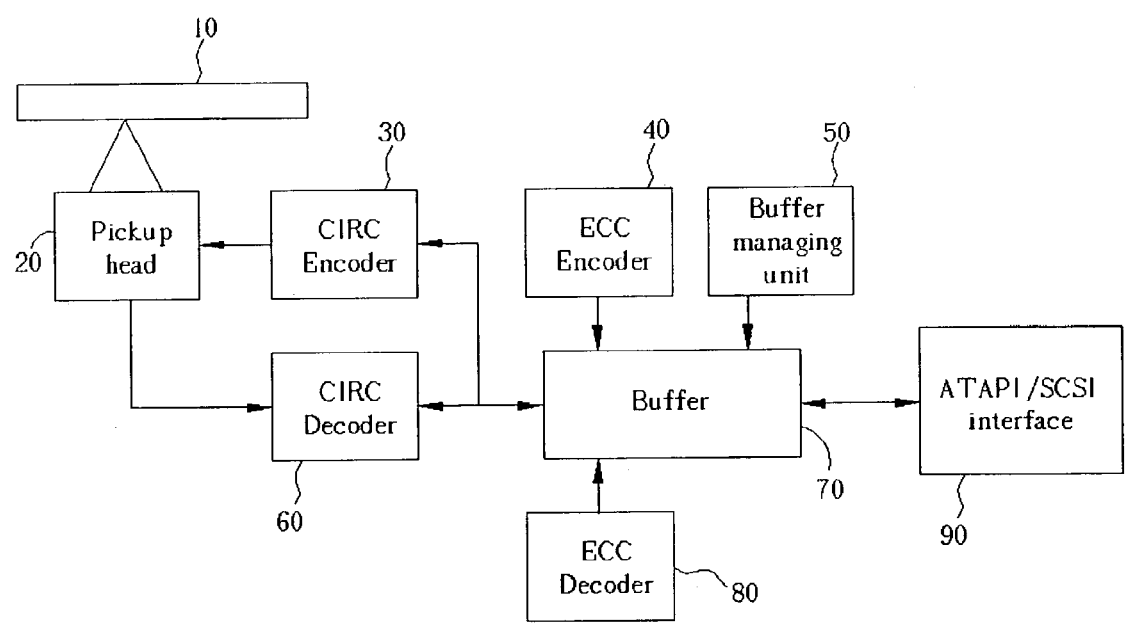
FIG. 1 is a block diagram of structure of a recordable disk drive according to the prior art.
Figure 2A:
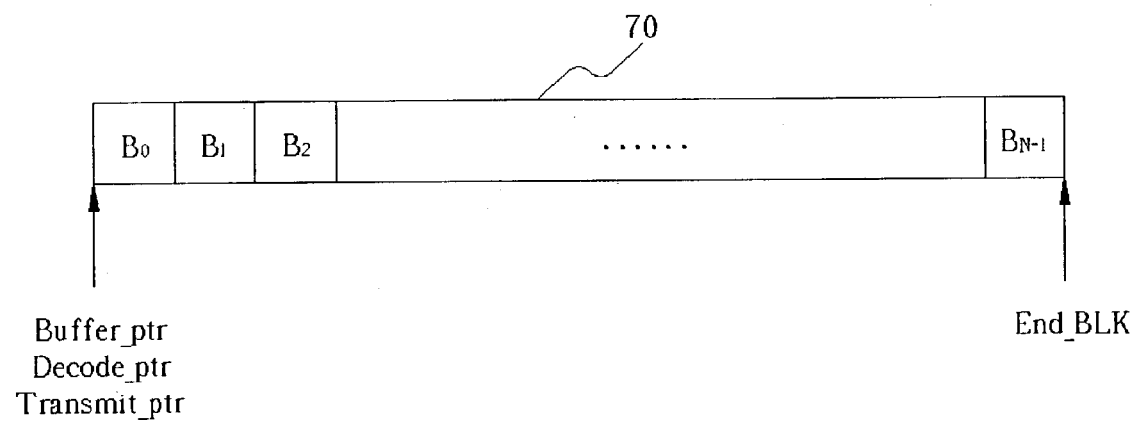
FIG. 2a to FIG. 2d are schematic diagrams of a managing procedure of a buffer according to the prior art.
Figure 2B:
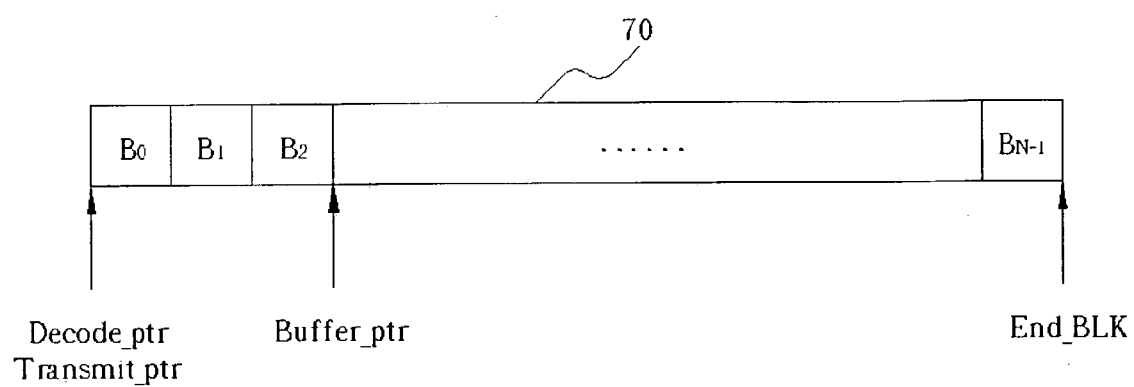
Figure 2C:
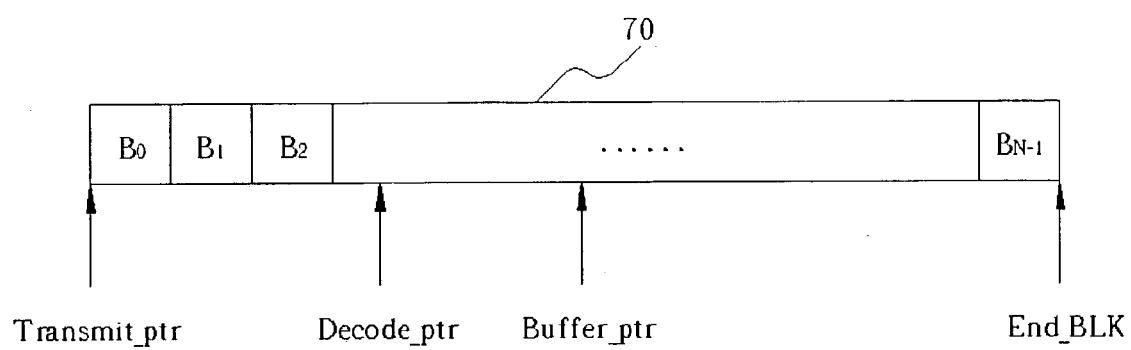
Figure 2D:
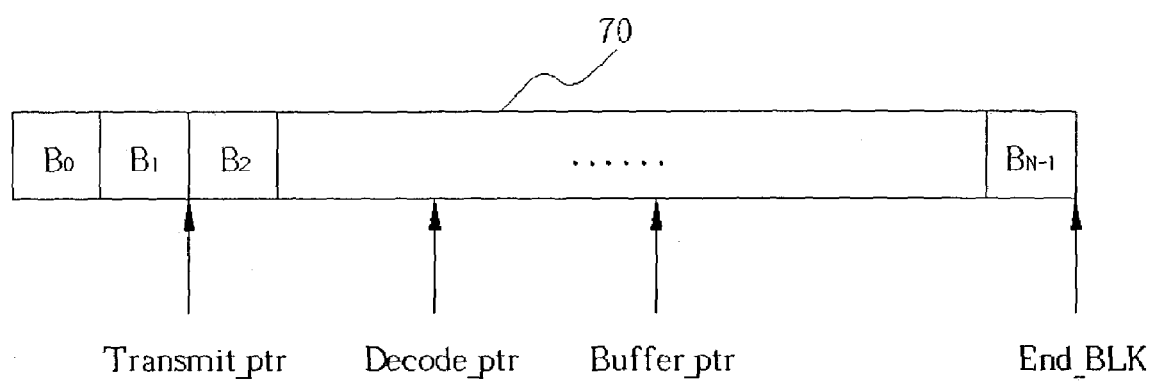
Figure 3A:
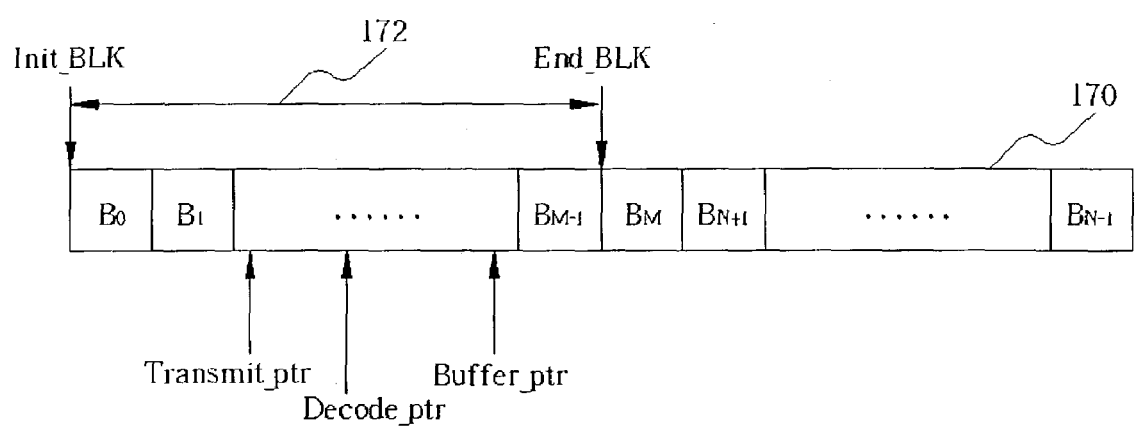
FIG. 3a to FIG. 3b are schematic diagrams of multiple section managing procedure of a buffer according to the present invention.
Figure 3B:
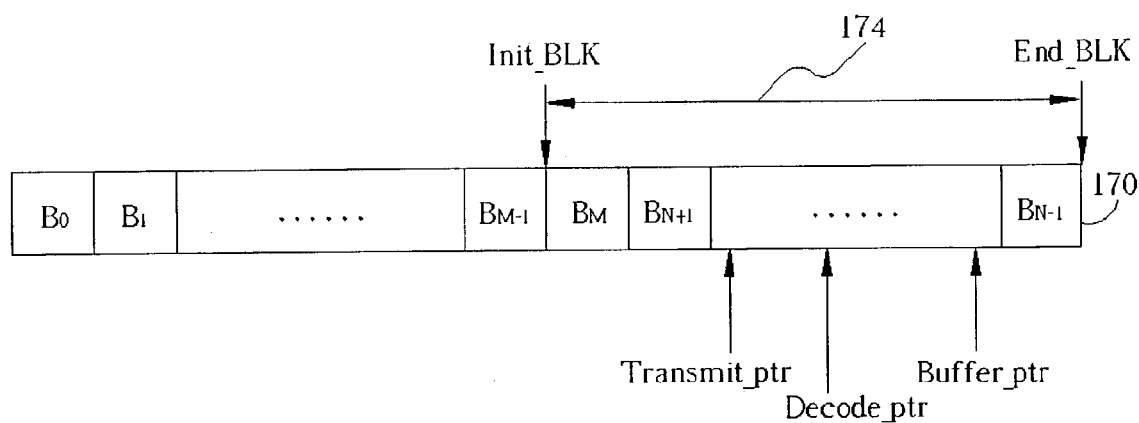

Please refer to FIG. 3a to FIG. 3b. FIG. 3a to FIG. 3b are schematic diagrams of a multiple section managing procedure of a buffer 170 according to the present invention. First, Init_BLK and End_BLK are set, in this embodiment, Init_BLK=0 (initial block is $B_0$), End_BLK=M-1 (end block is $B_{M-1}$). A first section 172 is formed between the block $B_0$ and the block $B_{M-1}$ as shown in FIG. 3a. Therefore, when the pickup head reads the data in the original track, the buffer 170 uses the first section 172 to store data. The content of the Buffer_ptr points to the block storing the data and subsequently points to the next block as received data increases. The ECC decoder decodes the ECC of the data block by block, and the data after ECC decoding is put into the original block. The content of the Decode_ptr points to the decoded block and subsequently points to the next block as the decoded data increases. When the data in the block are decoded, the buffer managing unit outputs the data block by block. The content of the Transmit_ptr points to the block preparing to output and then points to the next block as the output data increases. All pointer registers operate consecutively and cyclically between the block $B_0$ and the block $B_{M-1}$.

When the data that the pickup head needs are not in the first section 172 of the buffer 170, a miss condition occurs and the pickup head must skip to another track to read data. At this time, the buffer managing unit is capable of storing the contents of all registers in use in one division of the memory unit and resetting Init_BLK and End_BLK. In this embodiment, Init_BLK=M (initial block is $B_M$) and End_BLK=N-1 (end block is $B_{N-1}$). A second section 174 is formed between the block $B_M$ and the block $B_{N-1}$ as shown in FIG. 3b. In other words, according to the data being read from another track, the content of the Buffer_ptr points to the block storing the data and subsequently points to the next block as the received data increases. The ECC decoder decodes ECC of the data block by block, and the data after decoding is put into the original block. The content of the Decode_ptr points to the decoded block and subsequently points to the next block as the decoded data increases. When the data in the blocks are decoded, the buffer managing unit outputs the data block by block. The content of the Transmit_ptr points to the block preparing to output and points to the next block as the output data increases. All pointer registers operate consecutively and cyclically between the block $B_M$ and the block $B_{N-1}$.

According to this embodiment, in the reading procedure, when the pickup head must skip to another track to read data, the registers operated in the first section 172 will be stored in one division of the memory unit. The registers operated in the second section 174 are set and used for receiving and output data. When the pickup head returns to the original track to read data, because the registers operated in the first section 172 still exist, the buffer managing unit sends a hit condition and then stores the registers operated in the second section 174 in the other division of the memory unit, restores the registers operated in the first section 172, and directly outputs the hit data according to the restored contents of the registers. In this way, the pickup head does not skip to the original track to read data.

This embodiment according to the present invention only provides two sections to manage the buffer, however, the technique of the present invention is capable of being applied to managing multiple sections. The number of sections is not limited.

In contrast to the prior art, the present invention provides an structure and a method for managing a buffer so that when the pickup head skips to another track to read data in a miss condition, the pickup head does not need to further skip to the original track to read data.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of managing multiple sections of a buffer of an optical disc drive, the method comprising:

initializing a first register with a first start address of a first section of the buffer;

initializing a second register with a first end address of the first section of the buffer;

loading blocks of data for output into the first section of the buffer; and if at least one block of data that has not yet been outputted remains in the first section of the buffer and the first section of the buffer does not comprise data currently needed for output, storing the first start address and the first end address into memory, initializing the first register with a second start address of a second section of the buffer, initializing the second register with a second end address of the second section of the buffer, loading the currently needed data into the second section of the buffer, and outputting the currently needed data.

2. The method of claim 1 further comprising after outputting the currently needed data, restoring the first start address and the second start address from memory into the first register and the second register respectively.

3. The method of claim 1 further comprising outputting at least one of said at least one block of data that has not yet been outputted after restoring the first start address and the second start address from memory into the first register and the second register respectively.

4. The method of claim 2 further comprising after outputting the currently needed data, storing the second start address and the second end address into memory before restoring the first start address and the second start address from memory into the first register and the second register respectively.

5. The method of claim 1 further comprising initializing a third register with an address of a block of data in the first section of the buffer that is next to be outputted.

6. The method of claim 5 further comprising storing the address of a block of data in the first section of the buffer that is next to be outputted into memory when the first start address and the second start address are stored into the memory.

7. The method of claim 1 further comprising initializing a fourth register with an address of a block of data in the first section of the buffer that is next to be decoded.

8. The method of claim 7 further comprising storing the address of a block of data in the first section of the buffer that is next to be decoded into memory when the first start address and the second start address are stored into the memory.

* * * * *